June 17, 1969          D. JOHNSON          3,451,054
LIGHT OPTIC DIGITAL TRANSDUCER USING DISPLACED RONCHI RULINGS
Filed March 18, 1965          Sheet _1_ of 3
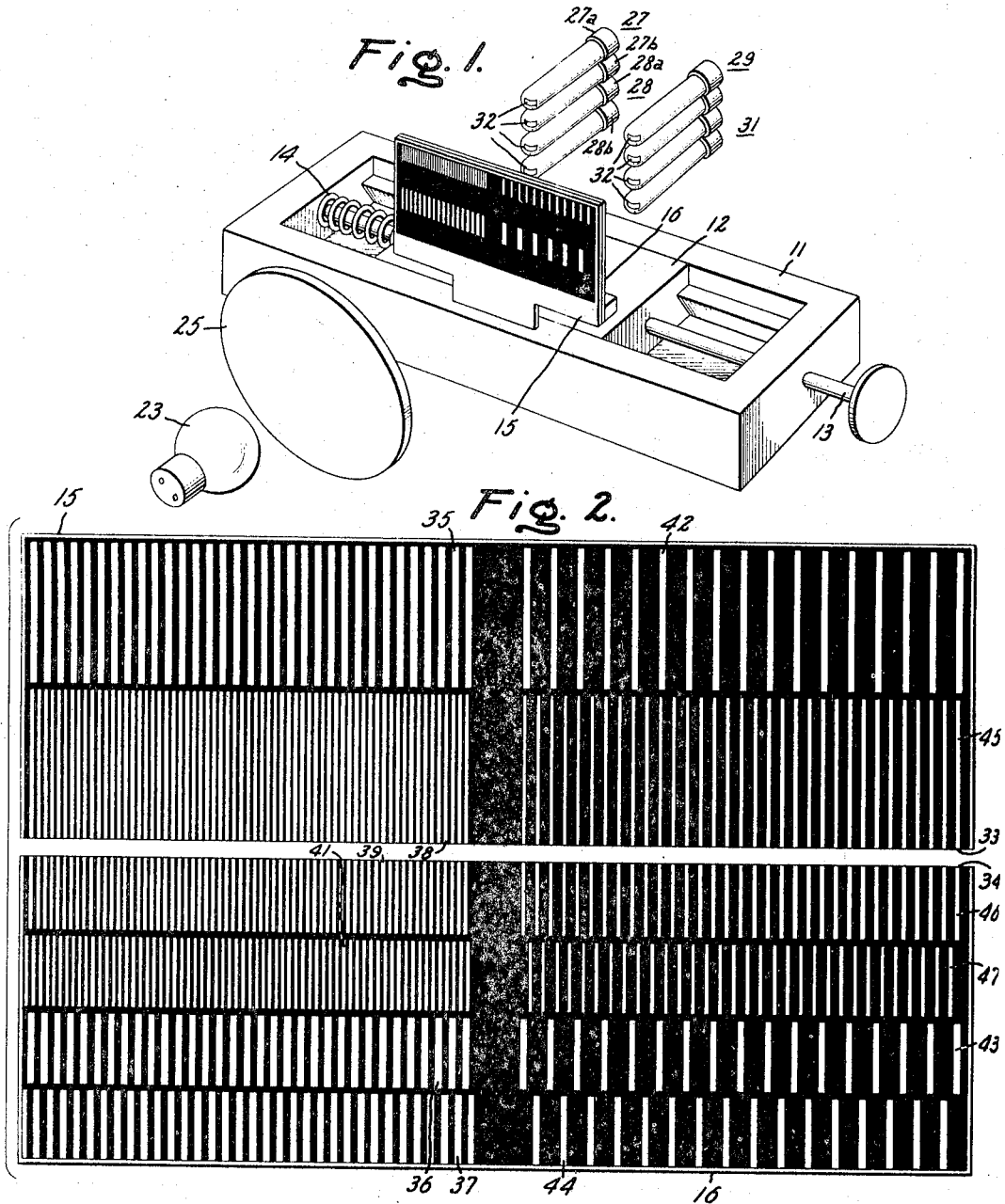
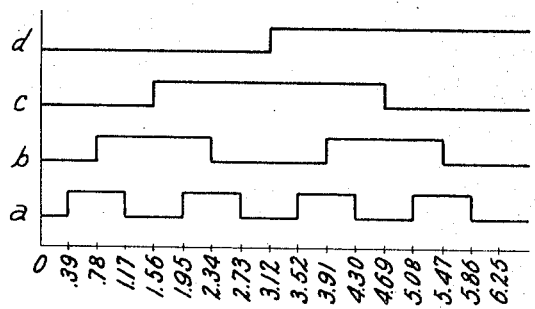
Inventor:
Daniel Johnson,
by Charles W Helzer
His Attorney.

Inventor:
Daniel Johnson,
by Charles W Helzer
His Attorney.

June 17, 1969     D. JOHNSON     3,451,054
LIGHT OPTIC DIGITAL TRANSDUCER USING DISPLACED RONCHI RULINGS
Filed March 18, 1965     Sheet 3 of 3
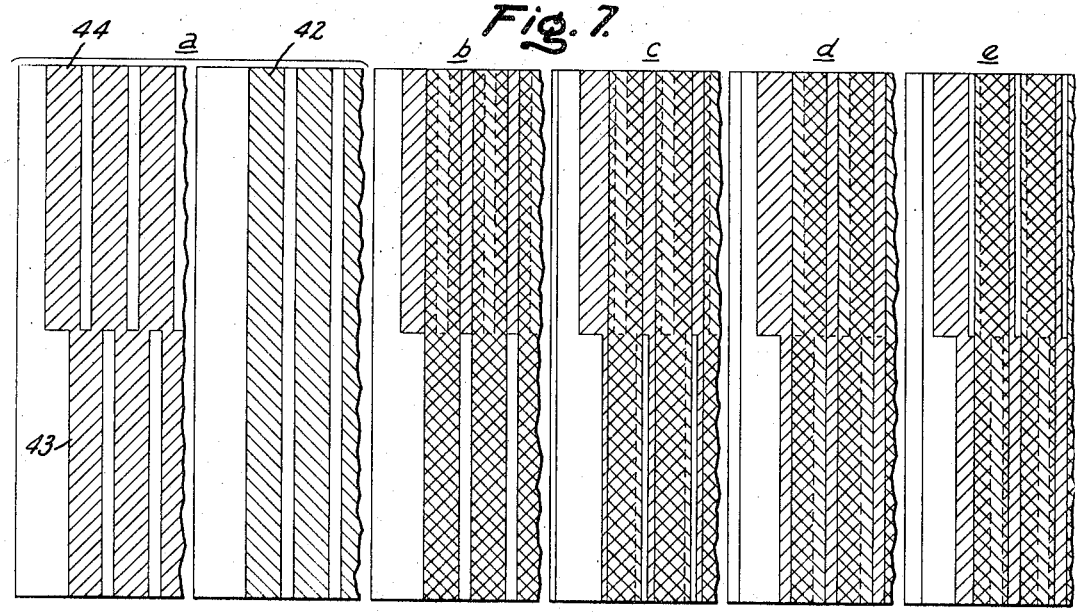
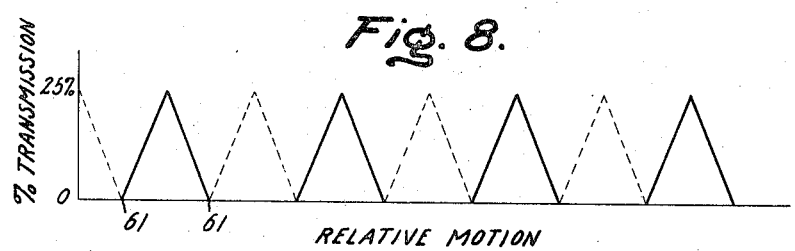
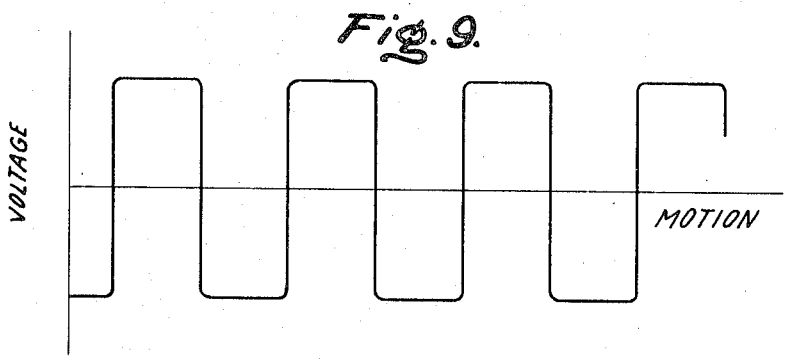
Inventor:
Daniel Johnson,
by Charles W Helzer
His Attorney.

United States Patent Office 3,451,054
Patented June 17, 1969

3,451,054
LIGHT OPTIC DIGITAL TRANSDUCER USING DISPLACED RONCHI RULINGS
Daniel Johnson, Schenectady, N.Y., assignor to General Electric Company, a corporation of New York
Continuation-in-part of application Ser. No. 184,231, Apr. 2, 1962, now Patent No. 3,214,751. This application Mar. 18, 1965, Ser. No. 440,906
Int. Cl. G01d 5/36
U.S. Cl. 340—347     5 Claims

ABSTRACT OF THE DISCLOSURE

A transducer employing light optic techniques develops a digital output signal in response to a phenomenon being measured. The digital transducer utilizes at least one set of relatively movable juxtaposed overlying rulings, one of the rulings being continuous ruling lines and the remaining ruling lines having two parts phase displaced 180° from each other. The total length of the ruling lines in two parts is equal to the continuous ruling lines length. A light source projects light through each set of rulings and an electro-optical means views the two separate parts of each pair of rulings to provide a digital electrical signal indicative of the phenomena being measured.

---

The present invention relates to a new and improved digital transducer.

More particularly, the invention relates to a transducer of the type which develops a digital output signal in response to a phenomena to be measured such as force, pressure, torque, temperature, acceleration, lineal motion, or the like, and which employs light optic techniques. This application is a continuation-in-part of U.S. application Ser. No. 184,231, filed Apr. 2, 1962, now Patent No. 3,214,751—Daniel Johnson, inventor—entitled "Digital Transducer Using Ronchi Rulings," assigned to the General Electric Company.

Due to the large increase in the use of digital computers in control systems, it has become increasingly necessary to convert large quantities of data in analog form to digital form for use by the computers in the system. Because this conversion equipment necessarily increases the complexity of the system, and also inserts an additional source of potential error into the system, it is much more desirable that sensors which provide a digital output signal in response to a phenomena being measured, be employed in the system. Hence, a control system which employs a digital transducer is greatly simplified over the conventional approaches requiring analog to digital conversion units, and they are also more reliable in that the possibility of loss of information in the conversion and transmission is reduced. While there are some digital transducers available to the industry, they are not altogether practical for all applications. For this reason, it is desirable to provide to the industry a new and improved digital transducer employing light optic techniques which is suitable for use in many new applications.

It is, therefore, a primary object of the present invention to provide a new and improved light optic digital transducer using displaced Ronchi rulings, and capable of deriving a digital output signal in response to an analog phenomenon being measured.

In practicing the invention a digital transducer is provided which comprises at least one set of relatively movable juxtaposed overlying rulings, one of the rulings being comprised of continuous ruling lines and the remaining ruling being comprised of two parts, the ruling lines of one part being phase displaced 180° with respect to the remaining part and with the total length of the ruling lines in both parts being substantially equal to the length of the continuous ruling lines in the first mentioned ruling. In a preferred embodiment of the invention, a plurality of such pairs of relatively movable juxtaposed overlying Ronchi rulings are provided. The pairs of Ronchi rulings are arranged in a manner such that the number of lines on the respective pairs of rulings vary in accordance with a predetermined geometric progression such as 1:2:4:8: 16:32:etc. In this arrangement, a means is provided for moving at least one ruling in each pair in response to the phenomenon to be measured, and means are provided for projecting light through each set of rulings. The device is completed by electro-optical means which are set up to view the two separate parts of each pair of rulings, and for deriving a discrete coded output electric signal indicative of a phenomenon being measured.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a prespective view of a new improved digital transducer constructed in accordance with the present invention;

FIGURE 2 is a plan view of two different sets of Ronchi rulings having phase displaced ruling lines which are used in the digital transducer shown in FIGURE 1 to derive a digital output indication from an applied analog motion to be measured;

FIGURE 3 is a series of wave shapes illustrating the character of discrete coded electric output signals derived by the various phototubes and their associated circuitry used with the digital transducer shown in FIGURE 1;

Figure 4:
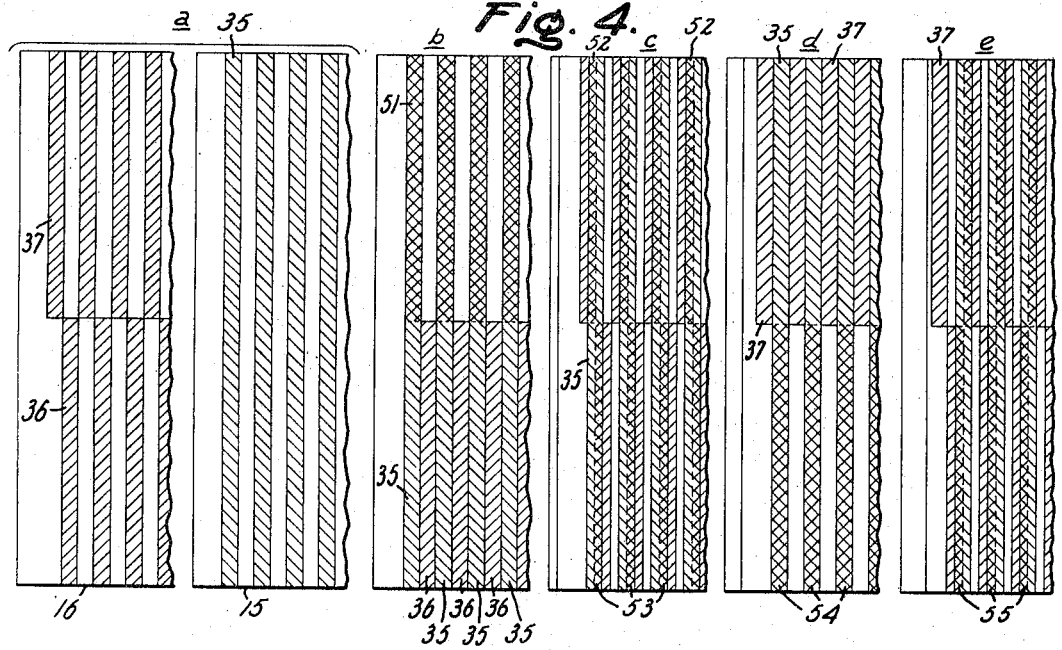
Figure 5:
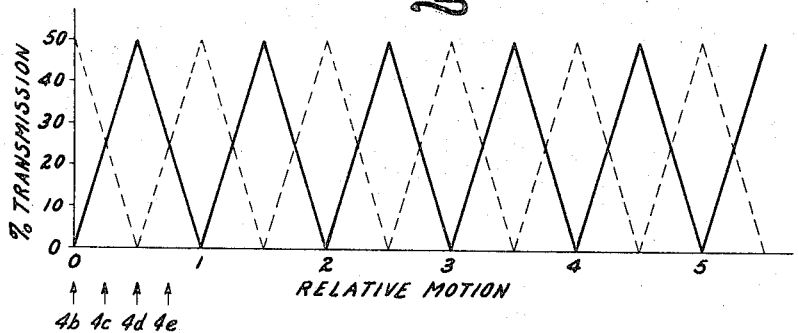
Figure 6:
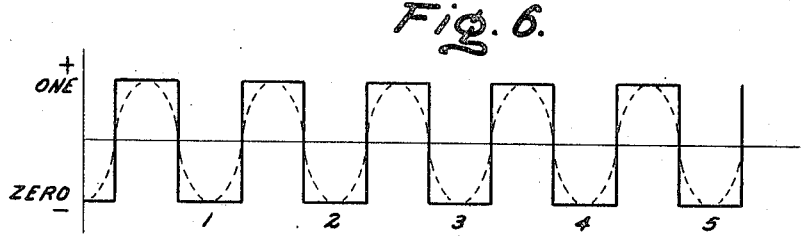

FIGURE 4 of the drawings is a plan view of several arrangements for one of the displaced Ronchi rulings pairs employed in the digital transducer shown in FIGURE 1, and illustrates the rulings in several different light transmission conditions;

FIGURE 5 is a characteristic curve showing the percent transmission of light versus position characteristics of the Ronchi ruling arrangements illustrated in FIGURE 4;

FIGURE 6 is a voltage versus position characteristic curve depicting the electric output signal derived from a measuring bridge circuit arrangement excited through the Ronchi ruling arrangements illustrated in FIGURE 4;

FIGURE 7 is a plan view of a different form of 3:1 displaced Ronchi ruling construction employed in the digital displacement transducer of FIGURE 1, and illustrates the same in a number of different light transmission positions;

FIGURE 8 is a characteristic curve plotting the percent transmission of light versus relative motion of the 3:1 displaced Ronchi rulings of FIGURE 7; and FIGURE 9 is an electric output voltage versus motion characteristic curve derived with the 3:1 displaced Ronchi ruling arrangement shown in FIGURE 7.

New and improved digital transducer shown in FIGURE 1 of the drawings comprises a supporting block 11 having an axially movable carriage 12 slidably supported therein. The axially movable carriage 12 is secured to an axially movable push rod 13 which is adapted to have a moving force applied to its end. This moving force may be in the form of a lineal motion caused by a pressure, a temperature sensitive member which moves in accordance with the temperature of its environment, an acceleration or other phenomenon to be measured. The lineal motion applied to the push rod 13 acts against a compression spring 14 which normally biases the carriage 12 into a zero output position as explained more fully hereinafter.

From the above description, it can be appreciated that the movement of the carriage 12 within the supporting block 11 comprises an analog measure of the phenomenon to be measured that is applied to the end of the push rod 13. In order to translate this analog movement of the carriage 12 into a digital indication of the phenmenon to be measured, a plurality of sets of juxtaposed, overlying, phase displaced Ronchi rulings, are provided on a pair of ruling members 15 and 16. These rulings preferably are formed by alternate transparent and opaque lines formed on a glass or other transparent backing member by conventional ruling techniques such as are available commercially through firms such as the W. & L. E. Gurley Company, Troy, N.Y. The ruling lines formed on member 16, which is secured to the carriage 12, move with carriage 12. The member 15 is secured to the supporting block 11 so that the ruling lines formed on this member are fixed relative to the ruling lines on member 16. If desired, the member 15 may be mounted on a tiltable supporting arm such as that disclosed in the above-identified copending application Ser. No. 184,231, to facilitate proper alignment of the ruling lines in each of the respective sets of rulings comprised by these lines.

In order to derive an output indication of the phenomenon being measured, electro-optical means are provided for viewing each individual pair of rulings on the members 15 and 16. This electro-optical means includes a light source 23 whose light rays are collimated by a collimating lens arrangement 25 and are directed onto the respective Ronchi ruling pairs on members 15 and 16. Light emanating from the opposite side of the Ronchi ruling pairs 15 and 16 is viewed by several sets of photoelectric devices 27, 28, and 29, 31, respectively. In order to view only the discrete areas of the Ronchi ruling pairs with which they are associated, the photoelectric devices 27, 28, and 29, 31 all have masks placed over their ends which have small slits or apertures 32 formed therein for restricting the area being viewed by the photoelectric devices. The photoelectric devices preferably comprise commercially available semiconductor photo cells manufactured by the General Electric Company.

The construction and effect of the juxtaposed overlying Ronchi ruling pairs on members 15 and 16 can be appreciated more fully in connection with FIGURES 2, 4 and 7. Referring to FIGURE 2 of the drawings, the details of construction of the two relatively movable juxtaposed overlying rulings members 15 and 16 are shown. If the member 15 is considered to be pivoted around its lower edge into an overlying relationship with respect to member 16 such as shown in FIGURE 1 of the drawings, their working relationship can be better visualized. With the two members 15 and 16 thus arranged, the plurality of sets of relatively movable, juxtaposed overlying rulings of alternate opaque and transparent lines would be formed. One such set would be formed by the fixed ruling lines 35 which would overlie the movable ruling lines 36 and 37. Similarly, the ruling lines 38 would overlie the ruling lines 39 and 41. In a like fashion, the ruling lines 42 would overlie ruling lines 43 and 44, and the ruling lines 45 would overlie ruling lines 46 and 47. It can be appreciated therefore that when thus disposed, each set of relatively movable juxtaposed overlying rulings are fashioned in a manner such that one of the rulings would be comprised of continuous ruling lines 35, for example, and the remaining ruling would be comprised of two parts. The ruling lines 41 of one part are phase displaced 180° with respect to the ruling lines 39 in the remaining part, and the total length of the ruling lines in both parts are substantially equal to the length of the continuous ruling lines 35 in the first mentioned ruling. A similar relationship exists between the sets of relatively movable overlying ruling pairs comprised by the ruling lines 38, 36 and 37, the ruling lines 42, 43, and 44, and the ruling lines 45, 46 and 47.

The ruling lines 35 through 47 are all comprised by alternate dark opaque lines and transparent lines formed on the transparent backing member such as glass, plastic, or some other suitable material. From a comparison of the ruling pair comprised by lines 35, 36 and 37 to the ruling pair comprised by lines 38, 39 and 41, for example, it can be appreciated that the set of rulings comprised by the ruling lines 35–37 is much coarser in that the lines are wider and there are fewer such lines for a given area of the ruling members 15 and 16. It should be noted, however, that with the sets of ruling comprised by lines 35 through 41, the alternate dark opaque lines are equal in width to the alternate clear transparent lines. This is in contrast to the sets of rulings comprised by the ruling lines 42 through 47. In each of these latter sets of rulings, the dark opaque lines are substantially wider, and in fact are three times wider than the clear transparent lines. The effect achieved by this difference in construction will be explained more fully hereinafter in connection with FIGURES 4–9.

FIGURE 4 of the drawings illustrates a greatly magnified view of a part of the ruling members 15 and 16. In FIGURE 4a, a portion of member 15 having the ruling lines 35 formed thereon is illustrated. Along side this portion of member 15 is a portion of the ruling member 16 having the ruling lines 36 and 37 formed thereon. It should be noted that the alternative opaque and clear ruling lines 36 and 37 of the portion of ruling member 16 comprise two parts wherein the part formed by opaque ruling lines 37 are phase displaced 180° with respect to the opaque ruling lines 36, but that the total length of the ruling lines formed by both parts is substantially equal to the length of the continuous ruling lines 35. The effect of this phase displacement of the part including ruling lines 37 with respect to the part including ruling lines 36 can best be appreciated in connection with FIGURES 4b through 4e of the drawings considered in conjunction with FIGURE 5 and FIGURE 6. It should also be noted that this same 180° phase displacement occurs with respect to the set of ruling lines 39 and 41, 43 and 44, and 46 and 47, and is true even though the opaque ruling lines 43 and 44, and 46 and 47 are three times as wide as the ruling lines 36 and 37.

Referring now to FIGURE 4b of the drawings, FIGURE 4b is intended to depict the condition wherein the portion of ruling member 15 is superposed over the portion of the ruling member 16 in a manner such that the continuous ruling lines 35 are directly aligned over the ruling lines 37 as illustrated by the crosshatched portion 51. With the two members 15 and 16 thus aligned, it can be appreciated that substantially 50% of the light source 23 shown in FIGURE 1 would be blocked by the crosshatched portion of the ruling lines 51 while on the lower part substantially all or 100% of the light would be blocked due to the complementary arrangement of the ruling lines 35 and the 180° phase displaced ruling lines 36. If the ruling lines are then moved relative to each other, a small amount, for example, ½ of a line spacing, then their relation would appear to the light source in the manner shown in FIGURE 4c of the drawings. As illustrated in FIGURE 4c, when thus disposed, the ruling lines 35 of member 15 overlap the ruling lines 36 at 52, and overlap the ruling lines 37 at 53. When thus disposed, the combination of the ruling lines will pass about 25% of the light from light source 23. If the two relatively movable members 15 and 16 are again moved another half a line width, the ruling lines will assume the relation shown in FIGURE 4d of the drawings wherein the crosshatched portion 54 indicates that the ruling lines 35 will completely overlie the ruling lines 36, but will complement the 180° phase displaced ruling lines 37. As a consequence, 50% of the light from source 23 would be allowed through the lower portion of the set of rulings, while all of the light will be blocked by the upper portion of the rulings. FIGURE 4e of the drawings illustrates the relation of the ruling lines if they are again moved through a distance of ½ of a line width. Here again the crosshatched portion 55 illustrates the areas where the continuous line 35 will overlie each part comprised by the ruling lines 36 and 37 in a manner such that again only 25% of the light from light source 23 is allowed to pass through the upper and lower parts of the rulings.

Referring again to FIGURE 1 of the drawings, it can be seen that each of the plurality of sets of relatively movable rulings formed on the members 15 and 16 have a pair of photoelectric devices 27 through 31 viewing the two different parts of each set of rulings. For example with respect to the ruling pair comprised by the ruling lines 35, 36 and 37, the two phototubes 28 are positioned to view the light source 23 through this set of ruling lines. The upper photoelectric device 28a will view the light source through the upper part comprised by ruling lines 36 while the lower photoelectric device 28b will view the light source 23 through the lower part comprised by the ruling lines 37. Accordingly, it can be appreciated that the photoelectric devices 28 are positioned so that generally speaking while one views a relatively light area through the rulings lines, the other will be viewing a relatively dark area. The same relation is true with respect to the remaining pairs of photoelectric devices 27, 29 and 31 with regard to their relation to the remaining sets of ruling lines.

The effect of the above-described arrangement on the photoelectric devices 28a and 28b is best illustrated in FIGURE 5 of the drawings wherein the percent of light transmission is plotted against the relative motion of the ruling pairs. For the purpose of illustration, assume that the sold dark line illustrates the percent of light transmitted through the lower ruling lines 36, and the dotted line represents the percent of light transmitted through the upper ruling lines 37. With the carriage 12 biased to its zero position by spring 14, then as indicated in FIGURE 5, zero light will reach the lower photoelectric device 28b while maximum or 50% of the light from light source 23 will be reaching the upper photoelectric device 28a. This condition is depicted in FIGURE 4b of the drawings. If then the carriage 12 is moved a half a line spacing so as to position the ruling lines in the manner indicated in FIGURE 4c of the drawings, then 25% of the light will reach the upper photoelectric device 28a and 25% will reach the lower photoelectric device 28b. Further movement of the carriage 12 will position the ruling line in a manner depicted by FIGURE 4d of the drawings so that now maximum or 50% of the light reaches the lower photoelectric device 28b and zero light reaches the upper photoelectric device 28a corresponding to the position of the ruling lines illustrated by FIGURE 4d. Continued movement of the two sets of ruling lines relative to each other will cause an output characteristic such as that illustrated in FIGURE 5 wherein the output from one photoelectric device is exactly 180° out of phase with the output from the other photoelectric device. The output signal from each of the photoelectric devices 28a and 28b may then be supplied to an output digitizing circuit such as is disclosed in the above-identified copending application Ser. No. 184,231, now Patent No. 3,214,751, to develop a square wave output signal such as shown in FIGURE 6 of the drawings. This square wave output signal may then be combined with other similar signals from the outputs of the remaining photoelectric devices in a manner to be decribed more fully hereinafter in connection with FIGURE 3 of the drawings. In this manner a discrete coded output signal for each position of the relatively movable ruling members 15 and 16 can be derived.

From a consideration of the above discussion, it can be appreciated that if the ruling lines from which the respective ruling pairs are frabricated have a varying thickness or coarseness so that the opaque lines become increasingly wider as the number of pairs of rulings are decreased, then the amount of linear movement required to cause a shift in the light level reaching one or the other of the photoelectric devices will be greater. If the number of lines forming the respective pairs of rulings is then varied in accordance with a predetermined geometric progression, such as the progression 1, 2, 4, 8, 16, it then becomes possible to derive a digital output indication of the position of the movable ruling member 16.

In order to obtain reliable digital output signals for larger lineal motions, which constitute the more significant bits of the coded output signal, and to insure that such signals are independent of variations in the characteristics of the photoelectric devices, it is desirable to employ rulings having a greater dark opaque line width than the width of the transparent lines. Such an arrangement is illustrated by the ruling pairs formed by the ruling lines 42–47 shown in FIGURE 2, and illustrated in greater detail in FIGURE 7. In FIGURE 7, the ruling pair comprised by the continuous ruling lines 42 and the phase shifted ruling lines 43 and 44 is shown in FIGURE 7a. If the continuous ruling lines 42 are superimposed over the ruling lines 43 and 44 in the manner shown in FIGURE 7b, so that the dark opaque lines 42 directly overlie the opaque lines 43, then maximum light will be transmitted through the lower portion of the ruling lines as illustrated by the dotted line curve shown in FIGURE 8. Thereafter if the rulings are caused to move a distance equal to one half of the width of the transparent lines in the rulings so as to appear as shown in FIGURE 7c of the drawings, only half of the maximum light will be transmitted through the lower portion of the rulings, and still no light will be transmitted through the upper portion. FIGURE 7d of the drawings illustrates a condition when there is no light passing through either the upper and lower portions of the rulings, that is all of the light is entirely blocked, and this corresponds to the point 61 on the curve shown in FIGURE 8. Thereafter if the relatively movable ruling member is caused to continue to move in the same direction, light will be admitted through the upper ruling lines 44 as illustrated by the solid line curve shown in FIGURE 8, and no light will be passed through the lower portions of the rulings. Again by prorperly treating the varying output signals from the photoelectric devices in a digitizing circuit such as that described in the above-identified copending application Ser. No. 184,231, now Patent No. 3,214,751, an essentially square wave signal similar to that shown in FIGURE 9 will be obtained. This output signal can then be combined with other similarly developed output signals from the other sets of photoelectric cells in a manner to be described hereinafter.

FIGURE 3 of the drawings represents a series of characteristic electric output signals derived from the photoelectric devices 27–31 of the digital transducer shown in FIGURE 1 of the drawings. These characteristic output signals are obtained from the output of the digitizing circuits connected to photoelectric devices 27–31, and essentially have two output amplitude levels dependent upon which one of a set of photoelectric devices, such as the photoelectric device 27a, views a predetermined percentage of the light from source 23 through its respective ruling pairs. In this connection, it should be noted that the characteristic waveshape shown in FIGURE 3a, for example, would represent the electric output from the two photoelectric devices 27, FIGURE 3b would represent the electric output from the two photoelectric devices 28, FIGURE 3c would represent the electric output signals from the two photoelectric devices 29, and FIGURE 3d would represent the electric ouput signal from the two photoelectric devices 31. It should also be noted that while a combination of only 4 sets of relatively movable rulings pairs have been disclosed in the specific embodiment of the invention described, the transducer can be readily designed to incorporate any desired number of sets of relatively moving ruling pairs in order to design into the transducer a desired measurement capability.

As stated above, the characteristics of the output signals produced by the various sets of photoelectric devices 27–31 will be dependent upon the spacing between the opaque ruling lines of the set of rulings being viewed. From a comparison of FIGURES 3a and 3b, for example, it can be appreciated that the characteristic output signal illustrated by FIGURE 3b requires greater movement between changes in amplitude levels than the signal waveform shown in FIGURE 3a. This is to be expected since the ruling lines and spaces of the ruling pair comprised by lines 35—37 are wider than the ruling lines and spaces of the rulings pair comprised by rulings lines 38–41. Similarly, the amount of movement between changes in amplitude levels of the characteristic output signals illustrated in FIGURES 3c and 3d is greater than the amount of movement required for changes in amplitude level of the output signal shown in FIGURES 3a and 3b for the same reason. By properly phasing the output signals from each of the several sets of photoelectric devices 27–31, the voltage versus lineal distance moved relationship illustrated by FIGURE 3 of the drawings can be achieved with the several output signals. With the output signals so phased, one can trace out a desired distance along the abscissa of the curve shown in FIGURE 3, and determine by reading up through the various output signals that at any particular point, a discrete and unique coded electric output is available for any given lineal distance. This signal then represents the condition or analog position of the movable carriage 12, and hence provides a discrete and unique coded digital output indication of the phenomena acting on the push rod 13. For example, if one starts with the zero value reading down through all of the curves $d$ through $a$ in FIGURE 3, a value of 0000 is given. Moving out a horizontal distance of 1.6 mils provides a reading of 0110. At a value of 3.2 mils, a reading of 1100 is obtained, and at a value of 4.8 mils, a reading of 1010 is obtained. From a consideration of the series of curves shown in FIGURE 3, it can be appreciated that there are 16 discrete and unique combinations of the output signals representing 16 different lineal distance points along the abscissa of the curve. These 16 discrete values in fact constitute a reflected binary code often referred to as the Gray code which is discussed in detail in U.S. Patent No. 2,632,058, issued Mar. 17, 1953. This reflected binary code can be readily translated into conventional binary code by known logic circuit means, or if desired, the reflected binary can be processed without translation into the conventional binary code. It should be noted, however, that no analog and digital conversion operation, or other ancillary conversion step is required in connection with the output signal generated by the photoelectric devices 27–31 and their associated digitizing circuits, in order to obtain a digital output signal representative of the analog position of the carriage 12, and hence representative of the value of the physical phenomena being measured and acting on the push rod 13. This reflected binary coded digital output signal is available simply by properly combining the output signals from the various photoelectric devices so as to obtain the phase relations illustrated in FIGURE 3 of the drawings.

From the above description, it can be appreciated that the present invention provides a new and improved light optic digital transducer using phase displaced Ronchi rulings for deriving a discrete coded digital output signal in response to an analog phenomenon being measured. By reason of its particular fabrication, a sharp transition of light to the photoelectric devices employed in the transducer is obtained, and results in the production of output signals that require very little further shaping to establish their digital character. These coded output signals can be obtained using rulings manufactured by conventional techniques. Since in the fabrication of the rulings, tolerances can be closely controlled with relative ease and little expense; a desired sensitivity can be designed into an instrument incorporating the features of the invention. Further, by employing the 3:1 variation in the width of the opaque ruling lines compared to the width of the transparent spaces for those ruling pairs used to generate the more significant bits of the coded output signal, the signals can be maintained relatively independent of variations in the characteristics (such as gain) of the photoelectric devices.

In view of the foregoing, it can be appreciated that various other forms of new and improved displaced digital transducers constructed in accordance with the invention are possible in the light of the above teachings. It is therefore to be understood that changes may be made in the particular embodiment of the invention described which are within the full and intended scope of the invention as defined by the appended claims.

What I claim as new and desire to secure by Letters Patent of the United States is:

1. A digital transducer comprising at least one set of relatively movable juxtaposed overlying rulings, one of the rulings being comprised of continuous light opaque and light transmitting lines, and the remaining ruling being comprised of two parts, the opaque line width being greater than the light transmitting line width, the opaque ruling lines of one part being phase displaced 180° with respect to the opaque ruling lines of the remaining parts, and with the total length of the ruling lines in both parts being substantially equal to the length of the continuous ruling lines in the first mentioned ruling, means for moving at least one of said rulings with respect to the other in response to a phenomenon to be measured, means for projecting light through the set of rulings, and electro-optical means comprising a pair of electro-optical devices positioned to view the two different parts of said one ruling whereby if one of the electro-optical devices generally views a relatively light area, the other electro-optical device generally views a relatively dark area and vice versa due to the 180° phase displacement of the ruling lines in the two parts of said one ruling, said electro-optical devices serving to derive a discrete output electric signal indicative of the relative movement of the rulings.

2. A digital transducer comprising a plurality of pairs of relatively movable juxtaposed overlying rulings, each pair of rulings having light opaque and light transmitting lines with one of the rulings in each pair being comprised of continuous opaque lines and the remaining ruling in the pair being comprised of two parts, certain of the pairs of rulings having opaque lines which are wider than the light transmitting lines, the opaque ruling lines of one part being phase displaced 180° with respect to the opaque ruling lines of the remaining part and with the total length of the ruling lines in both parts being substantially equal in length to the continuous opaque ruling lines in the first mentioned ruling, the number of lines on the respective pairs of rulings varying in accordance with a predetermined geometric progression, means for moving at least one ruling in each pair of rulings in response to a phenomenon to be measured.

3. The combination set forth in claim 2 wherein certain ones of the pairs of rulings are fabricated in a manner such that the light opaque lines are substantially three times as wide as the light transmitting lines in the rulings.

4. A digital transducer comprising a plurality of pairs of relatively movable juxtaposed overlying Ronchi rulings, each pair of rulings having light opaque and light transmitting lines of unequal width with the number of lines on each ruling in a pair being the same, one of the rulings in each pair being comprised of continuous opaque lines and the remaining ruling in the pair being comprised of two parts, the opaque ruling lines of one part being phase displaced 180° with respect to the opaque ruling lines of the remaining part and with the total length of the ruling lines in both parts being substantially equal in length to the continuous opaque ruling lines in the first mentioned ruling, the number of lines on the respective pairs of rulings varying in accordance with a predetermined geometric progression, means for moving at least one ruling in each pair in response to a phenomenon to be measured, means for projecting light through the pairs of rulings, and electro-optical means comprising a pair of electro-optical devices to view the two different parts of the said one ruling in each pair whereby if one of the electro-optical devices generally views a relatively light area, the remaining electro-optical device of the pair generally views a relatively dark area and vice versa due to the 180° phase displacement of the opaque ruling lines in the two parts of the said one ruling in each pair of rulings, said electro-optical means serving to derive a discrete output electric signal indicative of the movement of the rulings.

5. A digital transducer comprising a plurality of pairs of relatively movable juxtaposed overlying Ronchi rulings, each pair of rulings being comprised by light transmitting lines of equal width with the number of lines on each member in a pair being the same, one of the rulings in each pair being comprised of continuous opaque lines and the remaining ruling in the pair being comprised of two parts, the opaque ruling lines of one part being phase displaced 180° with respect to the opaque ruling lines of the remaining part and with the total length of the ruling lines in both parts being substantially equal in length to the continuous opaque ruling lines in the first mentioned ruling, the number of lines of the respective pairs of rulings being in accordance with geometric progression 1:2:4:8:16:, etc., means for lineally moving at least one ruling in each pair in response to a phenomenon to be measured, means for projecting light through the pairs of rulings, and electro-optical means comprising a pair of electro-optical devices to view the two different parts of the said one ruling in each pair whereby if one of the electro-optical devices generally views a relatively light area, the remaining electro-optical device of the pair generally views a relatively dark area and vice versa due to the 180° phase displacement of the opaque ruling lines in the two parts of the said one ruling in each pair of rulings, said electro-optical means serving to derive a discrete output electric signal indicative of the movement of the rulings, the opaque line width being greater than the light transmitting line width to obtain reliable digital output signals for larger motions of the said one ruling in each pair of rulings.

References Cited

UNITED STATES PATENTS

| | | |
|---|---|---|
| 2,861,345 | 11/1958 | Spencer. |
| 2,938,378 | 5/1960 | Canada et al. _____ 73—136 |
| 2,979,710 | 4/1961 | Toth _____ 340—347.4 |
| 2,993,200 | 7/1961 | Walker _____ 340—347.4 |
| 3,145,250 | 8/1964 | Vargady. |
| 3,214,751 | 10/1965 | Johnson _____ 340—347 |
| 2,886,717 | 5/1959 | Williamson et al. |

MAYNARD R. WILBUR, *Primary Examiner.*

J. GLASSMAN, *Assistant Examiner.*

U.S. Cl. X.R.

250—237; 356—169